Oct. 14, 1941.  W. L. MORRISON  2,258,996

AUTOMOBILE VENTILATING DEVICE OR WINDOW

Filed Aug. 29, 1938 4 Sheets-Sheet 1

Inventor
Willard L. Morrison
by Parker & Carter
Attorneys.

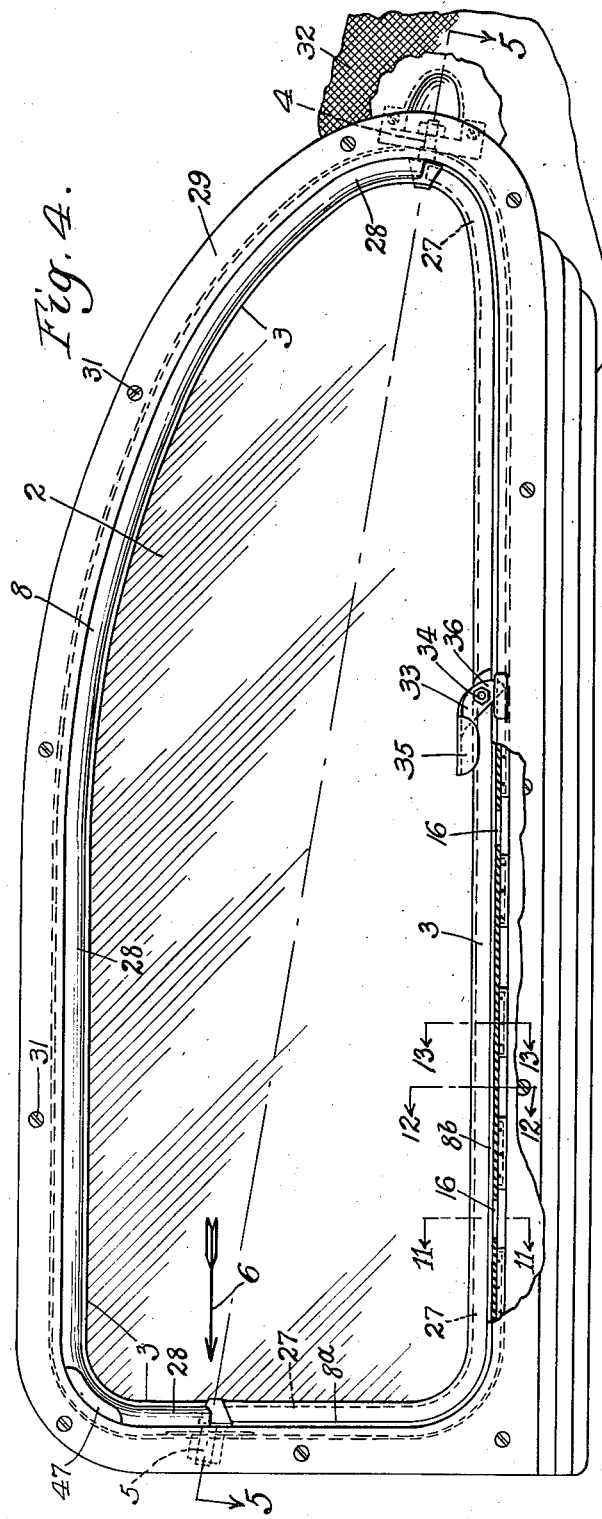

Oct. 14, 1941. W. L. MORRISON 2,258,996
AUTOMOBILE VENTILATING DEVICE OR WINDOW
Filed Aug. 29, 1938 4 Sheets-Sheet 3
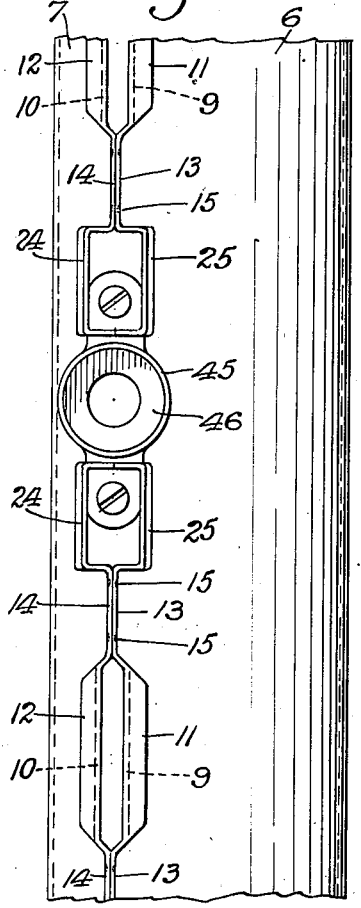
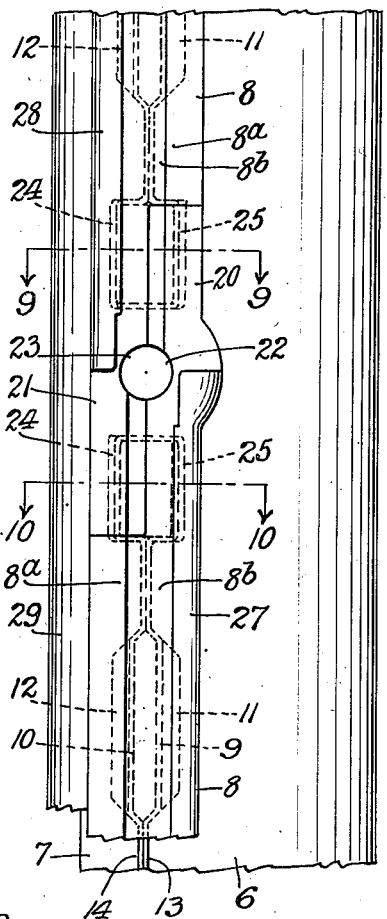
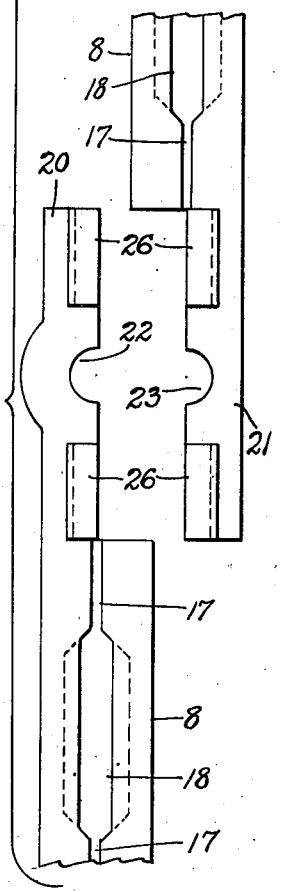
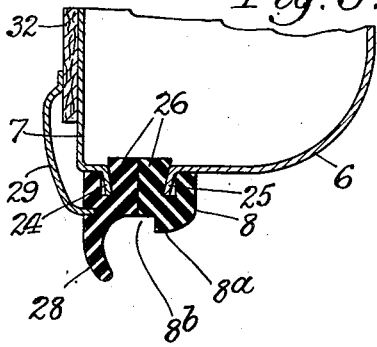
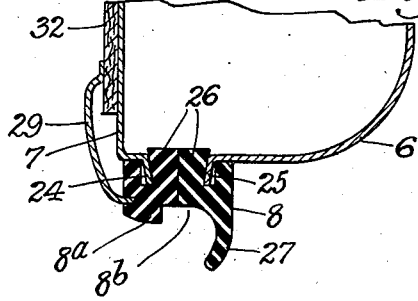
Inventor
Willard L. Morrison
by Parker & Carter
Attorneys.

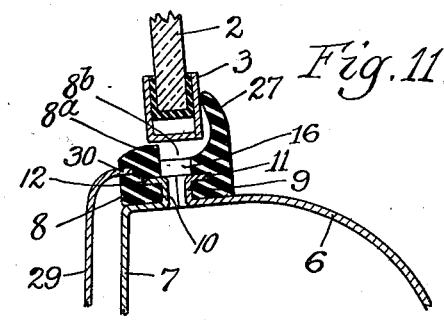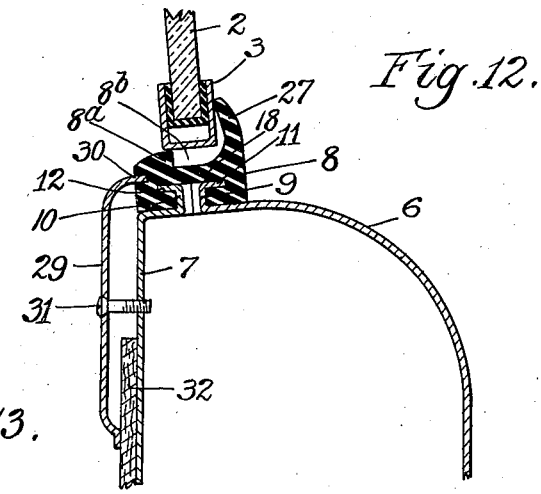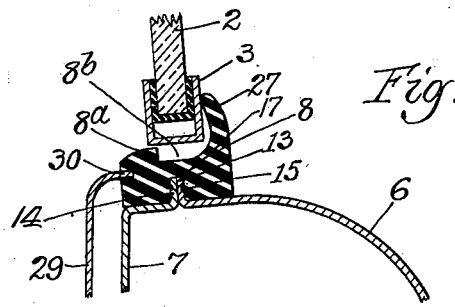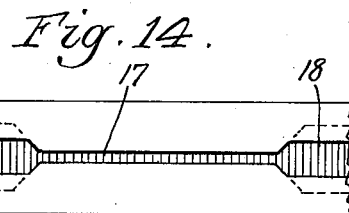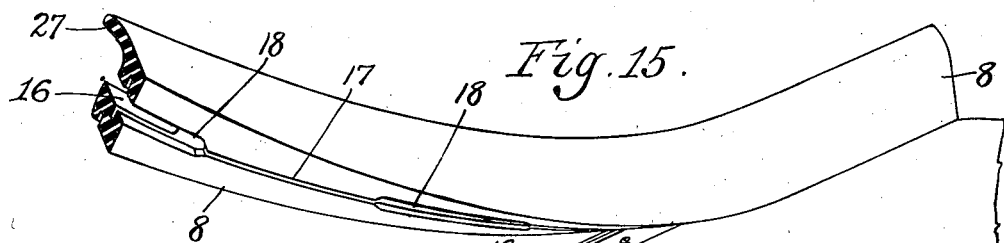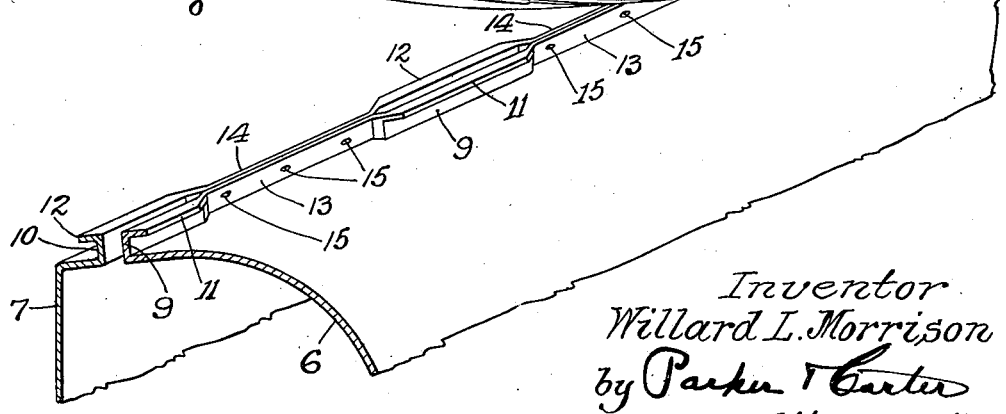

Patented Oct. 14, 1941

2,258,996

UNITED STATES PATENT OFFICE 2,258,996

AUTOMOBILE VENTILATING DEVICE OR WINDOW

Willard L. Morrison, Lake Forest, Ill.

Application August 29, 1938, Serial No. 227,302

14 Claims. (Cl. 296—44)

This invention relates to automobile ventilating devices or windows and has for its object to provide a new and improved device of this description.

The invention has a further object to provide an automobile window wherein the frame is part of the automobile body.

The invention has as a further object to provide a window with a cheap and effective sealing device.

The invention has as a further object to provide an automobile window with a sealing device which is connected directly with the body sheets of the automobile.

The invention has other objects which are more particularly pointed out in the accompanying description.

Referring now to the drawings:

Fig. 4 is an inside view of the window and door frame parts broken away and with parts in section;

Fig. 5 is a sectional view taken on line 5—5 of Fig. 4;

Fig. 6 is a detail view of the window frame looking in the direction of the arrow 6 of Fig. 4, the rubber sealing member and the window being removed;

Fig. 7 is a view similar to Fig. 6 with the rubber sealing member in place, but before the window is installed;

Fig. 8 is a bottom view of the rubber sealing member;

Fig. 9 is a sectional view on the line 9—9 of Fig. 7;

Fig. 10 is a sectional view on the line 10—10 of Fig. 7;

Fig. 11 is a sectional view taken on the line 11—11 of Fig. 4;

Fig. 12 is an enlarged sectional view taken on the line 12—12 of Fig. 4;

Fig. 13 is an enlarged sectional view taken on the line 13—13 of Fig. 4;

Fig. 14 is a view of the underside of the rubber sealing member which engages the window frame; and Fig. 15 is a perspective view showing the manner of installing the rubber sealing member.

Like numerals refer to like parts throughout the several figures.

Figure 1:
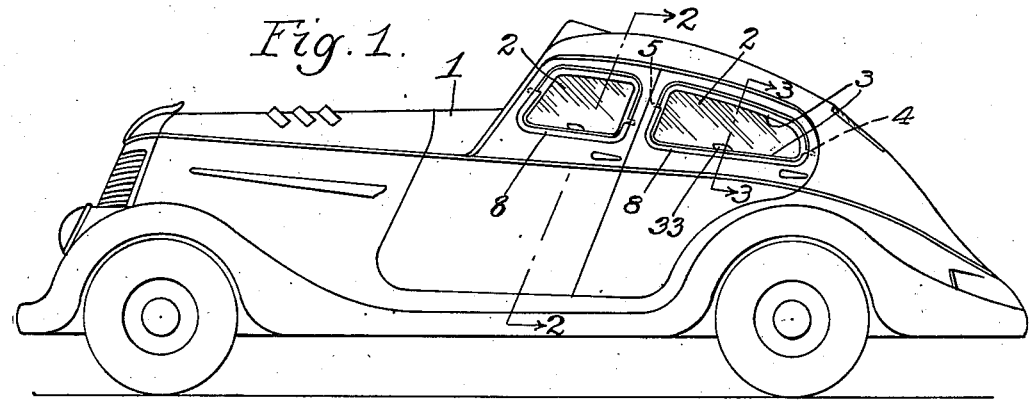
Fig. 1 is a side elevation of an automobile showing a construction embodying my invention.

Referring now to the drawings, I have shown an automobile 1 provided with one form of windows embodying the invention. In this construction I have shown pivoted windows which, instead of being pivoted at the top and bottom, are pivoted at the front and rear. The windows could of course be pivoted at the top and bottom if desired. Referring now to the window 2, this window consists of glass and is preferably provided with a frame 3 to which are connected the pivots 4 and 5. The window frame itself is made up of the body sheets 6 and 7. These body sheets are formed to receive the sealing device 8. As here shown, the edges of the body sheets are bent toward the window opening. At certain points along the window opening, the body sheets 6 and 7 have inwardly bent portions 9 and 10 and laterally bent portions 11 and 12, see Fig. 12. The sealing device 8, which is preferably of some form of rubber, has a groove in the face next to the window frame or body of the automobile into which the parts 9 and 10 are received and has also recesses into which the parts 11 and 12 are received. At other points along the window frame, the body sheets 6 and 7 simply have the inwardly projecting parts 13 and 14, and they are held together at 15, see Fig. 13.

Fig. 15, for example, shows quite clearly this construction. Along the bottom of the window may be arranged one or more openings extending in between the body sheets so as to permit any water that may be present to drop down between the body sheets. This construction is shown in Fig. 11. It will be noted that there is a space between the parts 9 and 10 and it will further be noted that the sealing device 8 is provided with several openings 16, 16 so that the water may drop down in between the body sheets. The sealing material is made up with the alternate small grooves 17 and large grooves 18 to receive the parts of the frame, and is placed in position by simply spreading the portions of the rubber on the sides of the groove so as to insert the members 9, 10, 11, 12, 13 and 14. The method of doing this is clearly shown in Fig. 15.

The construction of the sealing device at the pivots is shown in Figs. 6, 7 and 8. In this construction the device is split, the ends of the sections of the sealing device meeting here at the pivot. The sealing device can of course be made into as many sections as desired, but I prefer to make it into two sections which meet at the two pivot points. The ends of the sections, as clearly shown in Fig. 8, have the overlapping parts 20 and 21. These parts have the sections 22 and 23 of the opening for the pivot, and are brought together, each part extending beyond the pivot, as shown in Figs. 7 and 8. The body sheets on opposite sides of the pivot have the projections 24 and 25 separated but inclined towards each other, as clearly shown in Figs. 6, 7, 8 and 9. The sealing device has a portion 26 which extends between the parts 24 and 25 and which has its side walls inclined in a similar manner so as to assist in holding the parts in position.

Figure 3:
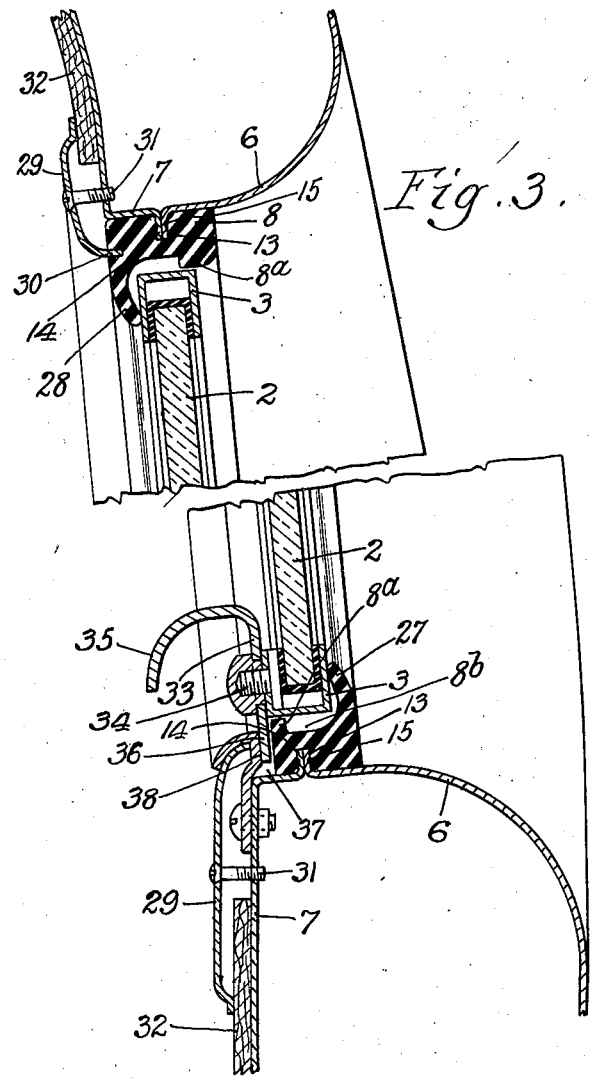
Fig. 3 is an enlarged sectional view taken on line 3—3 of Fig. 1 with parts broken away.
Figure 2:
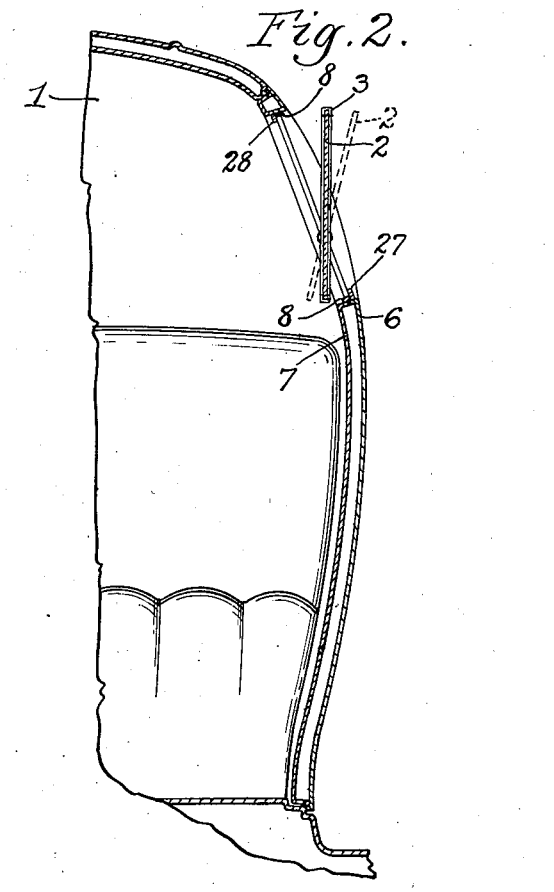
Fig. 2 is an enlarged sectional view taken on line 2—2 of Fig. 1.

The sealing device has inwardly extending sealing members which engage the vertical face of the window when the window is closed. These sealing members 27 and 28 are clearly shown in Figs. 3, 9 and 10. When the window is moved about its pivot, one portion moves in toward the interior of the body and the other portion toward the exterior of the body, see Fig. 2. The sealing member 27 is on one side of the sealing device, in this instance shown as being on the outside of the window, and the sealing member 28 is on the other side of the sealing device, in this instance on the inside of the window, so that the sealing members do not interfere with the opening or closing of the window and will engage the vertical or side faces of the window when it is closed. A flange-like member 8a extends around the sealing member 8 opposite the members 27 and 28 forming a groove or channel 8b in the sealing device, see Fig. 3, which will carry any water to the openings 16, 16, see Fig. 11, so that it will be properly taken care of.

It will be seen that when the ends 20 and 21 of the sealing device at the pivots are brought together, they are in the position shown in Fig. 7. I prefer to provide a garnish molding 29 which extends around the window opening and which may have an edge 30 which projects into a groove in the sealing device, see Figs. 11, 12 and 13. This garnish molding may be fastened in position in any desired manner as by means of the fastening devices 31, and will at one edge engage the upholstery material 32 on the inside of the automobile.

The windows may be provided with any suitable locking devices. I have shown a simple construction in Figs. 3 and 4, wherein there is a locking member 33 which is pivotally connected to the window frame 3 in any desired manner, as by means of the pivot 34. This locking device has a handle 35 by means of which it may be moved. If placed on the bottom of the window, it is moved to a vertical position to move it to its locking position. In its locking position the locking member 36 passes into a recess 37 and engages the locking face 38 so as to prevent the window from being opened from the outside. Any desired number of these locking devices may be used. One of the pivots is constructed as a friction pivot. I have illustrated the pivot 4 as such a friction pivot. It is connected to the frame 3 of the window and projects through the sealing device and into a recess 39, see Fig. 5. This recess is formed by bending the inner body sheet inward to form the section 40, see Fig. 5. The friction pivot may be of any suitable form, and is here shown as being provided with a spring 41 encircling the pivot and engaging a friction member 42 at one end and a friction member 43 at the other end. The pivot is threaded and there is a nut 44 which, when tightened, compresses the spring and enables the desired frictional resistance to be secured. The other pivot 5 may be of any desired form and as herein shown, projects through the body wall and into a casing 45 which is preferably filled with rubber 46 to permit the pivot to give or move laterally to prevent strain on the glass and to also prevent noise. A clip 47 may be placed at the corners of the window to assist in holding the rubber in place. I have shown one such clip in Fig. 4.

I claim:

1. A window comprising a window panel, a frame made up of the body sheets of the automobile having portions bent inwardly toward the window opening and in the plane of the window panel, a sealing device having a groove into which these bent portions are received, said sealing device extending around the window opening.

2. A window comprising a frame made up of the body sheets of the automobile having inwardly bent portions projecting inwardly toward the window opening, a sealing device having a groove into which these inwardly bent portions are received, said sealing device extending around the window opening, the inwardly projecting portions of said body sheets at intervals having laterally oppositely projecting parts at an angle to said inwardly bent portions which fit into laterally extending grooves in the sealing device on opposite sides of the inwardly bent portions.

3. A window comprising a frame made up of the body sheets of the automobile having portions bent inwardly toward the window opening, a sealing device having a groove into which these bent portions are received, said sealing device extending around the window opening, the inwardly projecting portions of said body sheets at intervals having laterally projecting parts which fit into grooves in the sealing device, said inwardly projecting portions being separated to form a space, the sealing device having an opening registering with this space so that water may pass down in between the body sheets.

4. A window comprising a window panel, a window frame made up of the body sheets of the automobile having portions bent inwardly toward the window opening and in the plane of the window panel, a sealing device having a groove into which these bent portions are received, said sealing device extending around the window opening, a window pivoted in position in the window opening, having pivots which extend through the sealing device, said sealing device at the pivots having separated sections in the same plane, each having a portion of the pivot hole therein, and each extending beyond the pivot, said sections when united forming the complete pivot hole.

5. A window comprising a frame made up of the body sheets of the automobile having portions bent inwardly toward the window opening, a sealing device having a groove into which these bent portions are received, said sealing device extending around the window opening, a window pivoted in position in the window opening, having pivots which extend through the sealing device, said sealing device at the pivots having overlapping portions, each having a portion of the pivot hole therein, and each extending beyond the pivot, the inwardly projecting portions of the body sheets on opposite sides of the pivot being inclined toward each other, and the parts of the sealing device which overlap having similarly inclined recesses to receive said projecting parts.

6. A window comprising a window panel, a window frame made up of the body sheets of the automobile having portions bent inwardly toward the window opening, a sealing device having a groove in the plane of the window panel into which these bent portions are received, said sealing device extending around the window opening, a window pivoted in position in the window opening, having pivots which extend through the sealing device, said sealing device at the pivots having separated sections in the same plane, each having a portion of the pivot hole therein, and each extending beyond the pivot, said sections when united forming the complete pivot hole, an inwardly projecting sealing member on the outside of the sealing device on one side of the pivot and an inwardly projecting sealing member on the other side of the sealing device on the other side of the pivot.

7. A window comprising a frame made up of the body sheets of the automobile having portions bent inwardly toward the window opening, a sealing device fitting over the inwardly bent portions of the body sheets and a window pivoted in said frame, the bent portions of said sheets being in the plane of the window.

8. A window comprising a window panel, a frame made up of the body sheets of the automobile having portions bent inwardly toward the window opening and meeting in the plane of said window panel, a sealing device fitting over the inwardly bent portions of the body sheets, and interlocking parts on said inwardly bent portions in the plane of said window panel to interlock with said sealing device to hold it in position.

9. A window for automobiles comprising a window frame formed integral with the body sheets of the automobile, a sealing device extending around the window opening, portions of said body sheets projecting into said sealing device to hold it in position and a window mounted in said frame, the portions of said body sheets which project into said sealing device being in the plane of the window.

10. A window for automobiles comprising a window panel, a window frame formed integral with the body sheets of the automobile, a sealing device extending around the window opening, portions of said body sheets in the plane of the window panel projecting into said sealing device to hold it in position, a window pivotally mounted within the window opening, the sealing device having separated sections in the same plane at the points where the pivots are located.

11. A window for automobiles comprising a window frame formed integral with the body sheets of the automobile, a sealing device extending around the window opening, portions of said body sheets projecting into said sealing device to hold it in position, a window pivotally mounted within the window opening, the sealing device having overlapping portions at the points where the pivots are located, the body sheets having inwardly projecting parts on opposite sides of the pivots inclined toward each other, the sealing device having a projecting portion which projects between these inwardly projecting parts and having inclined faces which engage said inwardly projecting parts.

12. A window for a closed automobile body comprising a frame made up of the body sheets of the automobile body, having portions bent inwardly toward the window opening, a sealing device having a groove into which these bent portions are received, said sealing device extending around the window opening, a garnish molding extending around the window opening and having an edge which projects into a recess in the sealing device and a window in the window opening, the bent portions of the body sheets projecting into the sealing device, being in the plane of the window.

13. A window comprising a frame made up of the body sheets of the automobile having portions bent inwardly toward the window opening, a sealing device having a groove into which these bent portions are received, said sealing device extending around the window opening, a window pivoted in position in the window opening, having pivots which extend through the sealing device, said sealing device at the pivots having overlapped portions, each having a portion of the pivot hole therein, and each extending beyond the pivot, a locking device for the window comprising a pivoted part pivoted to the window and having a fixed locking part on the inside of the automobile which is engaged by said locking member, said pivoted part when in its locking position utilizing the bent portions of the body sheets to resist outward movement of the window.

14. A window for automobiles comprising a window frame made from the body sheets, a sealing device extending around the window frame, the body sheets having their edges brought together to form the window frame, the edges being separated at the bottom of the window frame to form a water passageway, an opening through the sealing device through which water passes to the water passageway between the body sheets.

WILLARD L. MORRISON.